United States Patent
Claussen et al.

(10) Patent No.: US 6,865,930 B1
(45) Date of Patent: *Mar. 15, 2005

(54) TIRE INFLATION METHOD

(75) Inventors: Stephen P. Claussen, Richland, MI (US); Daryl J. Stacer, Portage, MI (US); James A. Beverly, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/403,900

(22) Filed: Mar. 31, 2003

Related U.S. Application Data

(63) Continuation of application No. 10/004,751, filed on Dec. 4, 2001, now Pat. No. 6,561,017.

(51) Int. Cl.[7] ............................................. G01M 17/02
(52) U.S. Cl. ....................................................... 73/146
(58) Field of Search .............................. 73/146, 146.2, 73/146.5, 146.8; 340/442–448; 152/419, 415

(56) References Cited

U.S. PATENT DOCUMENTS

| | | | |
|---|---|---|---|
| 2,695,122 A | 11/1954 | Learman | |
| 4,441,539 A | 4/1984 | Hulse | |
| 4,506,708 A | 3/1985 | Onuma | |
| 4,619,303 A | 10/1986 | Bryan et al. | |
| 4,640,331 A | 2/1987 | Braun et al. | |
| 4,678,017 A | 7/1987 | Schultz | |
| 4,708,184 A | 11/1987 | Pechar | |
| 4,724,879 A | 2/1988 | Schultz et al. | |
| 4,744,399 A | 5/1988 | Magnuson et al. | |
| 4,754,792 A | 7/1988 | Braun et al. | |
| 4,763,709 A | 8/1988 | Scholer | |
| 4,782,878 A | 11/1988 | Mittal | |

(List continued on next page.)

FOREIGN PATENT DOCUMENTS

| | | |
|---|---|---|
| EP | 0 531 070 A2 | 10/1993 |
| EP | 0 531 070 A3 | 10/1993 |
| EP | 1 044 828 A | 10/2000 |

OTHER PUBLICATIONS

"Tire Maintenance System Installation and Troubleshooting" Dana Corporation, Jul. 2001.
Cameron, David S. and Frank, David A., "Tire Pressure Management System", Oct. 1992 (2 pages).

*Primary Examiner*—Edward Lefkowitz
*Assistant Examiner*—Corey D. Mack
(74) *Attorney, Agent, or Firm*—Dykema Gossett PLLC

(57) ABSTRACT

A method of inflating a tire, or vehicle tire, that minimizes the amount of time needed for same is disclosed. The method of inflating a tire with a tire pressure management system includes introducing continuous fluid flow of a fluid into the tire, ascertaining the dynamic pressure of the fluid during said introducing continuous fluid flow, terminating continuous fluid flow when the dynamic pressure exceeds or equals a predetermined amount, and introducing pulsed fluid flow of the fluid into the tire.

17 Claims, 3 Drawing Sheets

U.S. PATENT DOCUMENTS

| | | |
|---|---|---|
| 4,782,879 A | 11/1988 | Le Chatelier et al. |
| 4,825,925 A | 5/1989 | Schultz |
| 4,860,579 A | 8/1989 | Beverly |
| 4,875,509 A | 10/1989 | Da Silva |
| 4,883,105 A | 11/1989 | Schultz |
| 4,883,106 A | 11/1989 | Schultz et al. |
| 4,893,664 A | 1/1990 | Oltean |
| 4,898,216 A | 2/1990 | Schultz et al. |
| 4,905,742 A | 3/1990 | Mohs |
| 4,917,163 A | 4/1990 | Schultz |
| 4,922,946 A | 5/1990 | Boulicault |
| 4,924,926 A | 5/1990 | Schultz et al. |
| 5,071,259 A | 12/1991 | Metzger et al. |
| 5,121,774 A | 6/1992 | Hicks et al. |
| 5,174,839 A | 12/1992 | Schultz et al. |
| 5,179,981 A | 1/1993 | Hicks et al. |
| 5,180,456 A | 1/1993 | Schultz et al. |
| 5,249,609 A | 10/1993 | Walker et al. |
| 5,253,687 A | 10/1993 | Beverly et al. |
| 5,273,064 A | 12/1993 | Beverly et al. |
| 5,291,776 A | 3/1994 | Mallison |
| 5,309,969 A | 5/1994 | Mittal |
| 5,313,995 A | 5/1994 | Schultz |
| 5,409,045 A | 4/1995 | Walker et al. |
| 5,429,166 A | 7/1995 | Anzai et al. |
| 5,505,080 A | 4/1996 | McGhee |
| 5,516,379 A | 5/1996 | Schultz |
| 5,540,268 A | 7/1996 | Mittal |
| 5,553,647 A | 9/1996 | Jaksic |
| 5,587,698 A | 12/1996 | Genna |
| 5,600,301 A | 2/1997 | Robinson, III |
| 5,611,875 A | 3/1997 | Bachhuber |
| 5,629,873 A | 5/1997 | Mittal et al. |
| 5,629,874 A | 5/1997 | Mittal |
| 5,674,332 A | 10/1997 | Battocchio |
| 5,838,229 A | 11/1998 | Robinson, III |
| 6,067,850 A | 5/2000 | Lang et al. |
| 6,098,682 A | 8/2000 | Kis |
| 6,144,295 A | 11/2000 | Adams et al. |
| 6,246,317 B1 | 6/2001 | Pickornik et al. |
| 6,250,327 B1 | 6/2001 | Freigang et al. |
| 6,283,186 B1 | 9/2001 | Krisher |
| 6,293,147 B1 | 9/2001 | Parker et al. |

TIRE INFLATION METHOD

This application is a continuation of U.S. Application Ser. No. 10/004,751 filed Dec. 4, 2001 now U.S. Pat. No. 6,561,017, the entire disclosure of which is incorporated herein by reference.

BACKGROUND OF HE INVENTION

Conventional tire pressure management systems typically have central tire inflation systems (CTI systems), also known as on-board inflation systems and traction systems. These tire pressure management systems are well known, as may be seen by reference to the following U.S. Pat. Nos. 5,516,379; 5,313,995; 5,273,064; 5,253,687; 5,180,456; 5,179,981; 5,174,839; 5,121,774; 4,924,926; 4,922,946; 4,917,163; 4,893,664; 4,883,106; 4,883,105; 4,825,925; 4,782,879; 4,754,792; 4,724,879; 4,678,017; 4,640,331; and 4,619,303. The entire disclosure of each of these patents is incorporated herein.

Generally, tire pressure management systems employ a pneumatically controlled wheel valve that is affixed to each vehicle wheel assembly for controlling tire pressure in response to pressure signals from a fluid control circuit. The fluid control circuit is connected to each wheel valve via a rotary seal assembly associated with each wheel valve. In some systems, tire pressure is monitored by means of a sensor that is positioned in a conduit assembly in the fluid control circuit. When the wheel valve and certain control valves are opened, the pressure in the conduit assembly equalizes to tire pressure which can be sensed by the sensor. An electronic control unit receives electrical pressure signals generated by the sensor and appropriately controls the fluid control circuit in response thereto for inflating or deflating a selected tire.

Over time, the energy costs for operating a tire inflation management system can grow. Also, although not continuous, tire inflation management systems chronically draw compressed fluid from, thus have potential for compromising, a vehicle compressed fluid supply that services higher priority vehicle systems, such as a vehicle braking system. Reducing the amount of time a tire inflation management system draws compressed fluid from the vehicle compressed fluid supply and inflating or deflating vehicle tires ensures the availability of compressed fluid for other, perhaps higher-priority, vehicle systems and reduces the amount of energy needed to maintain vehicle tires. Reducing inflation time also enables vehicles to quickly adapt to changed surface conditions, for example, when surface conditions chance from uneven or soft to level and hard, which may require significant inflation of all vehicle tires. What is needed is a method of inflating vehicle tires that minimizes the amount of time needed for same.

SUMMARY OF THE INVENTION

The invention provides a method of inflating a tire, or vehicle tire, that minimizes the amount of time needed for same. The method of inflating a tire with a tire pressure management system includes introducing continuous fluid flow of a fluid into the tire, ascertaining the dynamic pressure of the fluid during said introducing continuous fluid flow, terminating continuous fluid flow when the dynamic pressure exceeds or equals a predetermined amount, and introducing pulsed fluid flow of the fluid into the tire.

The invention provides improved elements and arrangements thereof, for the purposes described, which are inexpensive, dependable and effective in accomplishing intended purposes of the invention. Other features and advantages of the present invention will become apparent from the following description of the preferred embodiments, which refers to the accompanying drawings.

BRIEF DESCRIPTION OF THE DRAWINGS

The invention is described in detail below with reference to the following figures, throughout which similar reference characters denote corresponding features consistently, wherein.

DETAILED DESCRIPTION OF THE PREFERRED EMBODIMENT

The invention is a method of inflating vehicle tires that minimizes the amount of time needed for same. The method may be achieved with known tire pressure management systems, such as the exemplary tire pressure management system described below.

Figure 1:
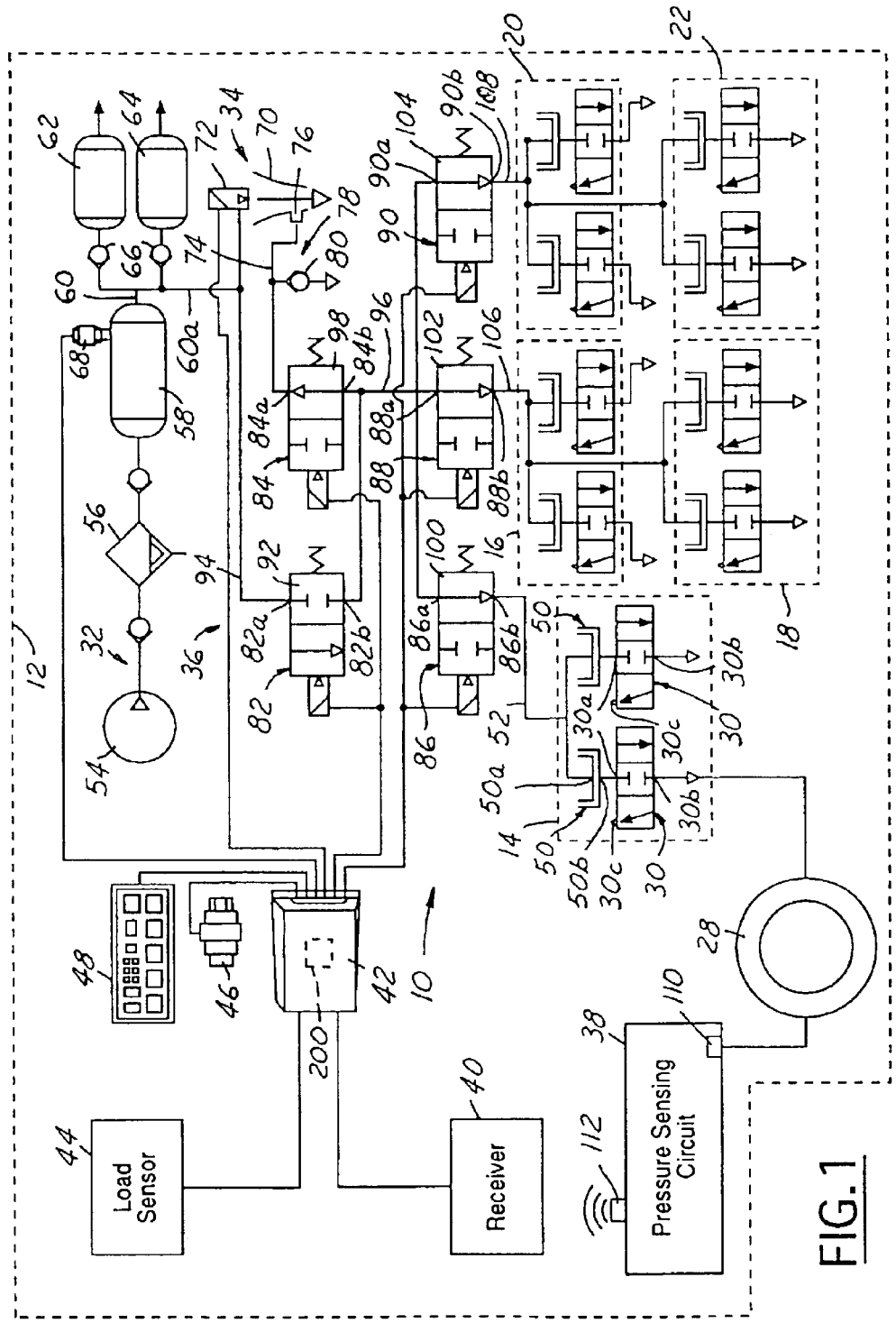
FIG. 1 is a diagrammatic view of a tire pressure management system for a vehicle, a vehicle incorporating same being shown in dotted line.

FIG. 1 shows a tire pressure management system 10 for a vehicle 12 for describing, but not limiting applicability of the invention. Vehicle 12 may be, but is not limited to being a tractor-trailer. The system may be used in connection with a wide variety of vehicles, including automobiles.

Figure 2:
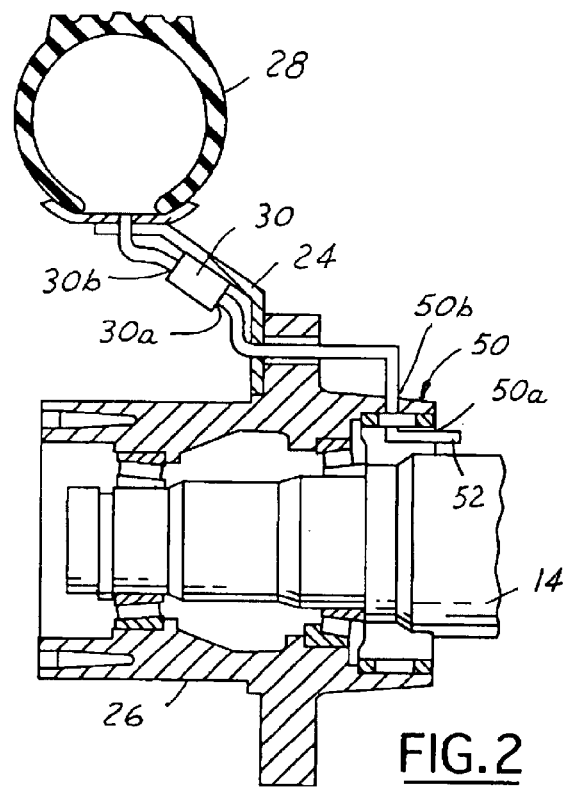
FIG. 2 is a cross-sectional detail view of a conventional vehicle wheel assembly.

Vehicle 12 may include a plurality of axles, including a steer axle 14, a tandem axle assembly having drive axles 16, 18 and another tandem axle assembly having trailer axles 20, 22. As shown in greater detail in FIG. 2, each axle, such as drive axle 14, may include wheels 24 affixed to wheel hubs 26 disposed at each outboard end of the axle and rotationally supported on axle 14. Each wheel 24 may include one or more inflatable tires 28 mounted thereon.

System 10 monitors and controls pressure within each tire 28 of vehicle 12. System 10 may include wheel valve assemblies 30, a fluid source 32, a vacuum source 34, and a fluid control circuit 36. System 10 may further include at least a sensor 200, one or more electronic control units 42, one or more load sensors 44, a speed sensor 46, and an operator control device 48.

Wheel valve assemblies 30 are provided to control the flow of pressurized fluid into and out of tires 28. Valve assembly 30 is mounted to each end of each axle and is connected to the remainder of system 10 through a rotary seal connection 50. Wheel valve assembly 30 is conventional in the art and may include the wheel valve assembly described and illustrated in U.S. Pat. No. 5,253,687 or U.S. Pat. No. 6,250,327, the entire disclosures of which are incorporated herein.

Rotary seal assembly 50 also is conventional in the art and may include the rotary seal assembly described and illustrated in U.S. Pat. No. 5,174,839, the entire disclosure of which also is incorporated herein.

Referring again to FIG. 2, wheel valve assembly 30 may include an inlet port 30*a* coupled to a rotatable port 50*b* of rotary seal assembly 50, an outlet port 30*b* in fluid communication with the interior of tire 28, and an exhaust port 30*c*, best shown in FIG. 1. Rotary seal assembly 50 may further include a non-rotatable port 50a connected to a conduit 52 of fluid control circuit 36. Valve assembly 30 assumes a closed position, as illustrated in FIG. 1, when the fluid pressure at inlet port 30a is substantially atmospheric, an open position connecting inlet port 30a and outlet port 30b when the fluid pressure at inlet port 30a is a positive pressure, and an exhaust position connecting outlet port 30b and exhaust port 30c when the fluid pressure at inlet port 30a is a negative pressure.

Fluid source 32 provides positive pressurized fluid to system 10 and tires 28. Fluid source 32 is conventional in the art and may include a pressure source, such as a pump 54, an air dryer 56, and a first fluid tank 58 connected via a conduit 60 to the brake system fluid tanks 62, 64 and to the fluid control circuit 36 via a branch conduit 60a. Check valves 66 prevent sudden loss of fluid pressure in brake tanks 62, 64 in the event of upstream pressure loss. A pressure sensor 68 monitors pressure within tank 58 and provides a pressure indicative signal to electronic control unit 42.

Vacuum source 34 produces a negative pressure in system 10 to decrease fluid pressure in tires 28 of vehicle 12. Vacuum source 34 also is conventional in the art and may include a vacuum generator 70 controlled through a solenoid valve 72. A low pressure zone is produced by passing fluid through a venturi like portion of vacuum generator 70. Upon urging solenoid valve 72 into an open position via a control signal from electronic control unit 42, a vacuum or negative fluid pressure, relative to atmospheric pressure, is introduced in a conduit 74, which has a small orifice 76 disposed proximate the low pressure zone produced by generator 70. Conduit 74 also is connected to a one-way vent valve 78 for rapid venting of positive fluid pressure from conduit 74. Vent valve 78 includes a valving member 80 that is drawn into a closed position in response to negative fluid pressure in conduit 74 and is urged into an open position in response to positive pressure fluid in conduit 74.

Fluid control circuit 36 directs the flow of pressurized fluid within system 10 for controlling pressure in tires 28 of vehicle 12. Control circuit 36 may include a pair of pressure control valves 82, 84 and a plurality of axle distribution valves 86, 88, 90. As shown, a single fluid control circuit 36 controls pressure in all of the tires 28 of vehicle 12. However, control circuit 36, and other portions of system 10, may be replicated so that, for example, one control circuit 36 may control tire pressures in the tractor portion of vehicle 12 and another control circuit 36 may control tire pressure in the trailer portion of vehicle 12.

Pressure control valve 82 directs positive pressurized fluid from fluid source 32 to tires 28 of vehicle 12. Valve 82 may include a conventional two position-two way, solenoid controlled and pilot fluid operated valve. Valve 82 includes a valving member 92 that is spring biased toward a closed position, as shown in FIG. 1. Valving member 92 assumes an open position in response to energizing of a solenoid operatively associated therewith via control signals from electronic control unit 42. Valve 82 has a first port 82a coupled to a conduit 94 leading to fluid source 32. Valve 82 has a second port 82b coupled to another conduit 96 leading to axle distribution valves 86, 88, 90.

Pressure control valve 84 vents control circuit 36. Valve 84 is conventional in the art and may also include a two position-two way, solenoid controlled and pilot fluid operated valve. Valve 84 includes a valving member 98 that is spring biased toward an open position, as shown in FIG. 1. Valving member 9S assumes a closed position in response to energizing a solenoid operatively associated therewith via control signals from electronic control unit 42. Valve 84 has a first port 84a coupled to conduit 74 leading to orifice 76. Valve 84 has a second port 84b coupled to conduit 96 leading to axle distribution valves 86, 88, 90.

Axle distribution valves 86, 88, 90 limit the supply of positive pressurized fluid to, or the release of fluid from, the tires 28 of one or more axles 14, 16, 18, 20, 22 of vehicle 12. Valves 86, 88, 90 are conventional in the art and may include two position-two way, solenoid controlled and pilot fluid operated valves. Valves 86, 88, 90 direct the flow of fluid to and from the tires 28 of axles 14, 16 and 18, and 20 and 22, respectively. Each of valves 86, 88, 90 includes a valving member 100, 102, 104, respectively, that is spring-biased toward an open position, as shown in FIG. 1, and which assumes a closed position in response to energizing a solenoid operatively associated therewith via electrical signals from electronic control unit 42. Each of valves 86, 88, 90 respectively has first ports 86a, 88a, 90a coupled to conduit 96. Each of valves 86, 88, 90 respectively has second ports 86b, 88b, 90b leading to respective corresponding conduits 52, 106, 108 for each axle or tandem axle of vehicle 12.

Although axle distribution valves 86, 88, 90 are shown, individual tire distribution valves could be used in conjunction with axle distribution valves 86, 88, 90 or as an alternative to axle distribution valves 86, 88, 90 to further control the flow of fluid to and from individual tires 28 of vehicle 12. Further, although only three axle distribution valves 86, 88, 90 are shown, the number of axle distribution valves may be varied depending upon the number of axles of vehicle 12 and to allow for greater individual control of the tires 28 of vehicle 12.

Sensor 200 may be electrically integrated with electronic control unit 42. Sensor 200 is disposed in fluid communication with conduit assemblies for conducting fluid to and/or from tires 28. Sensor 200 may transmit a parameter signal indicative of a measured parameter associated with a corresponding tire 28 of vehicle 12. The parameter may be fluid pressure or another value, such as tire temperature, that may be indicative of tire pressure.

Figure 3:
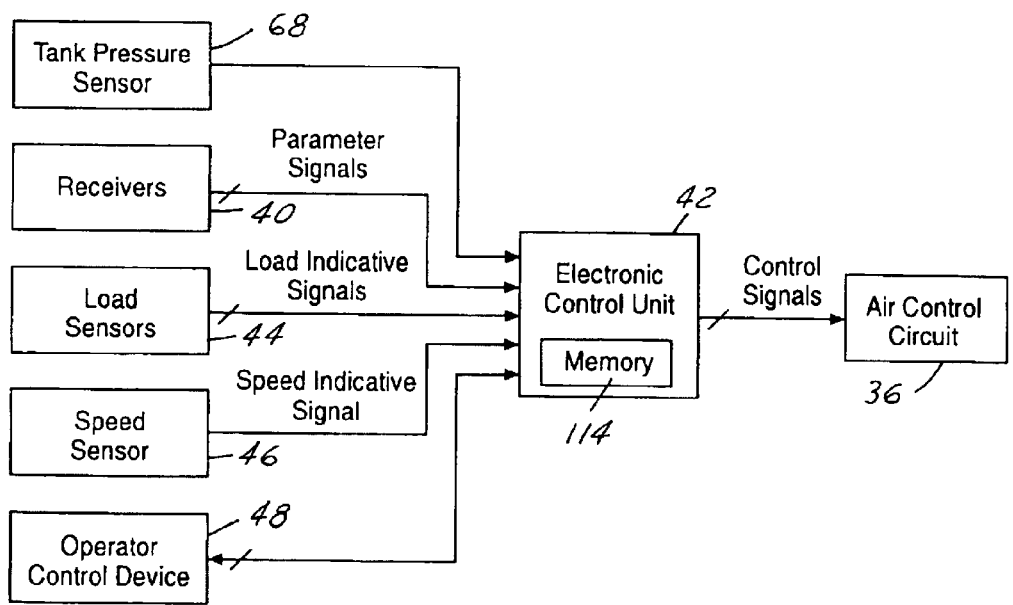
FIG. 3 is a schematic view of components of the system of FIG. 1.

Referring to FIG. 3, electronic control unit 42 controls fluid control circuit 36. Control unit 42 may include a microprocessor operating under the control of a set of programming instructions commonly referred to as software. Electronic control unit 42 may include a memory 114 in which the programming instructions are stored. Memory 114 also may contain identification codes for each tire 28 of vehicle 12 to uniquely identify the particular tire 28 to which a particular parameter signal corresponds. Memory 114 also may be used to record tire pressure values or user inputs over a period of time to assist in evaluating tire pressure management.

Control unit 42 may receive input signals from sensor 200, one or more load sensors 44, speed sensor 46, and operator control device 48. Control unit 42 outputs a plurality of control signals to control valves 82, 84, 86, 88, 90 of fluid control circuit 36 and solenoid valve 72 of vacuum source 34. Control unit 42 also may generate a plurality of output signals to a display device which may include a part of operator control device 48 or a freestanding device. The latter signals may be used to trigger the display pressure readings and/or deflection levels for each vehicle tire 28, the load on vehicle 12 or a portion of it, and the speed of vehicle 12. The signals may also be used to trigger warnings to the operator of vehicle 12 in the event that pressure cannot be maintained in one of the vehicle tires 28, the pressure exceeds or falls below predetermined maximum and minimum tire pressure values, or the pressure differs from a target pressure value by more than a predetermined amount.

Load sensors 44 provide an indication as to the load on vehicle 12 and, consequently, tires 28 of vehicle 12, or the load on some portion of vehicle 12 and, consequently, select tires 28 of vehicle 12. Load sensors 44 are conventional in the art and load sensing may be provided in a variety of known ways, including through analysis of pneumatic pressure in the suspension of vehicle 12, analysis of powertrain parameters, the use of displacement transducers, or the implementation of load beams and strain gauges. Each load sensor 44 may provide one or more signals to electronic control unit 42 indicative of the load bearing on vehicle 12 or a portion thereof.

Electronic control unit 42 may initiate pressure adjustment in tires 28 of vehicle 12 in response to signals from load sensors 44 in a variety of ways. For example, electronic control unit may cause an increase or decrease in the pressure in one or more tires 28 responsive to a corresponding increase or decrease in vehicle load based on a variety of linear or non-linear functions. One or more tire deflection tables may be stored in a memory, such as memory 114, and accessed by electronic control unit 42 responsive to the signals from load sensors 44.

Speed sensor 46 measures the speed of vehicle 12 to further control deflection levels for tires 28. High deflection levels can create safety concerns and reduce tire life if maintained while vehicle 12 is operating at relatively high speeds. Speed sensor 46 is conventional in the art and provides a signal to electronic control unit 42 corresponding to speed.

Operator control device 48 may allow the operator of vehicle 12 to exert at least some level of control over system 10. Device 48 is conventional in the art and may include a plurality of input/output devices, such as a keypad, touch screen, switches or similar input devices, and a display screen, sound generator, lights or similar output devices. Thus, device 48 permits an operator of vehicle 12 to transmit control signals to electronic control unit 42 to adjust pressure levels within the tires 28 of vehicle 12. The control signals may, for example, correspond to deflection levels for tires 28 of vehicle 12. As a result, the operator is able to adjust the deflection level of the tires 28 to correspond to the terrain over which vehicle 12 is traveling. Such control is desirable to provide improved floatation and traction on certain terrain.

The sequencing and interaction of components of system 10 may be appreciated more readily in the context of the following description of the present method.

Figure 4:
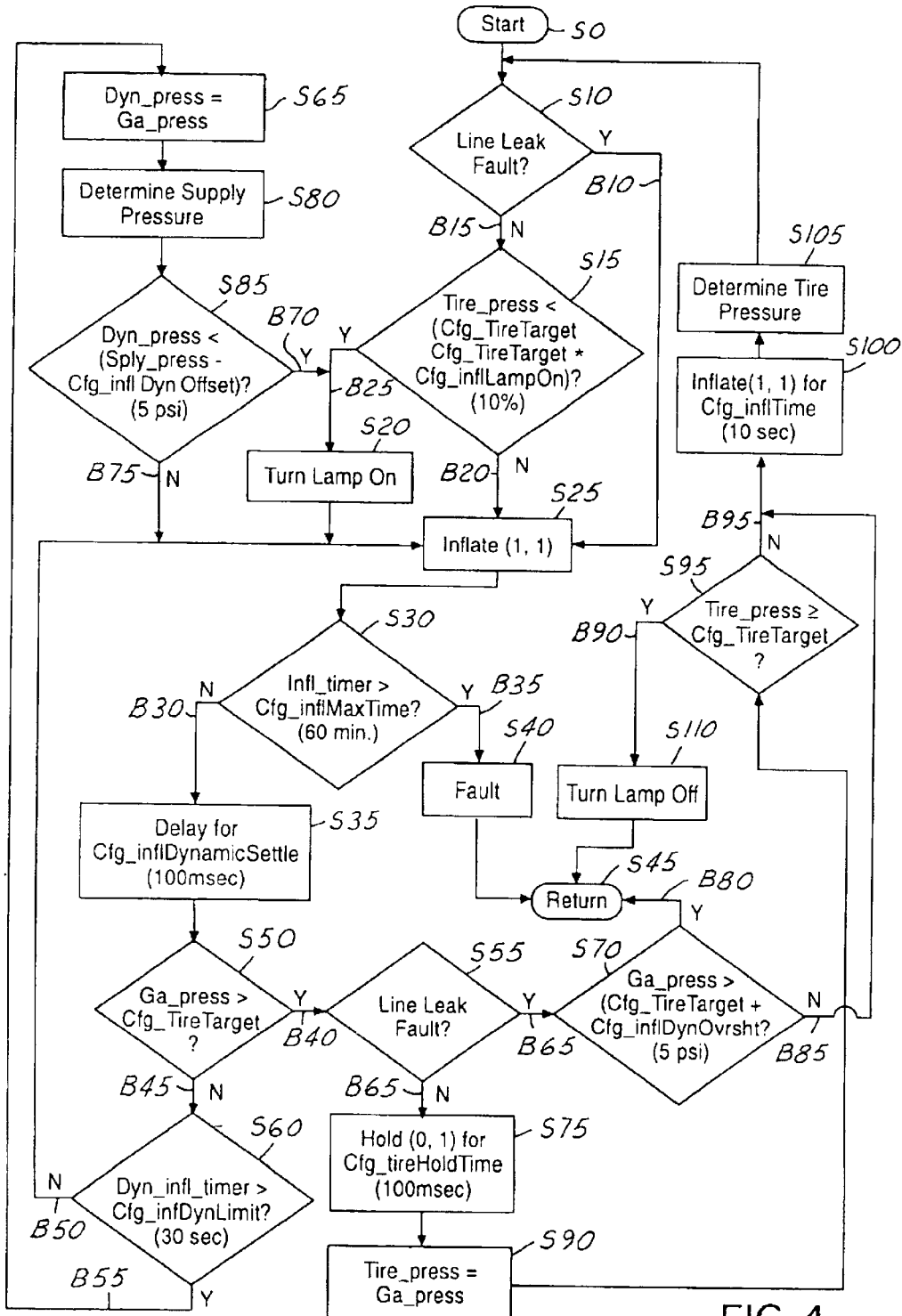
FIG. 4 is a schematic view of a flow chart for a method configured according to the invention.

FIG. 4 diagrammatically shows a flow chart of an embodiment of the present method. This embodiment could be called within the execution of a master tire pressure maintenance program (not shown). For example, control unit 42 would pass control to step S0 when a routine of the master tire pressure maintenance program informed control unit 42 that a current pressure value corresponding to the pressure measured in at least one of tires 28 is less than an operator-configured, or operator designated, target pressure. Thereafter, control unit 42 passes control to step S10.

At step S10, the invention provides for determining whether a line leak fault exists. Control unit 42 evaluates whether a line leak flag was set by a line leak testing routine (not shown) which determines whether the conduit assemblies exhibit an incapacity to maintain fluid pressure, for example, due to a rupture. If control unit 42 determines that a line leak flag has been set, control unit 42 passes control along branch B10 to step S25, described below. If control unit 42 determines that a line leak flag has not been set, control unit 42 passes control along branch B15 to step S15.

At step S15, the invention provides for determining whether the current pressure value is within a tolerance range, such as within 0–10% of a target pressure. If the current pressure value is within the tolerance range, or less than 10% below the target pressure, control unit 42 passes control along branch B20 to step S25, described below. If current pressure value is not within the tolerance range, or greater than 10% below the target pressure, in consideration of the regular frequent master tire pressure maintenance program cycles, such is indicative of a problem. Consequently, control unit 42 passes control along branch B25 to step S20.

At step S20, the invention provides for illuminating a lamp as an alarm to indicate that a problem may exist with respect to system 10 or tires 28. Alternatively, step S20 may provide for for otherwise alerting an operator that immediate servicing may be required. Control unit 42 thereafter passes control to step S25.

At step S25, the invention provides for inflating any or all of tires 28. Control unit 42 instructs solenoid 82 and any of solenoids 86, 88 and/or 90 to open, and solenoid 84 to close, thereby opening fluid communication between fluid source 32 and tires 28, as described above. Control unit 42 then passes control to step S30.

At step S30, the invention provides for determining whether the inflating time exceeds a manufacturer-configurable, or manufacturer determined, inflating time limit. For example, if a line leak exists or fluid source 32 is supplying fluid at an inadequate pressure, inflating may extend indefinitely without tires 28 ever attaining the target pressure. If allowed to attempt to inflate tires 28 indefinitely, pressurized fluid in the conduit assemblies would act against the rotary seal assembly 50, which would suffer excessive wear and fail prematurely. Accordingly, if the inflating time is greater than the inflating time limit, control unit 42 passes control along branch $B_{35}$ to step S40, described below. If the inflating time is not greater than the inflating time limit, control unit 42 passes control along branch $B_{30}$ to step S35.

At step S35, the invention provides for delaying further action for a predetermined time. This provides sufficient time for the fluid flow to stabilize. Control unit 42 then passes control to step S50, described below.

At step S40, the invention provides for establishing that a fault exists. Control unit 42, for example, may set a fault flag then pass control to step S45.

At step S45, the invention provides for returning control to the master tire pressure maintenance program.

At step S50, the invention provides for determining whether the dynamic gage pressure in the conduit assemblies is greater than an operator-configurable, or operator determined, target tire pressure. During steps S25, S30, S35, S50 and S60, tires 28 undergo dynamic inflation whereby the pressure thereof rapidly approaches the target pressure. However, the dynamic pressure measured necessarily will be higher than a static pressure measures after fluid flow is terminated and pressure among the conduit assemblies and tires 28 equalizes. Thus, dynamically inflating tires 28 until the dynamic pressure measured is greater than the target will not result in a static pressure that is greater than the target, rather close to, but less than the target pressure. Thereafter, if needed, according to the invention, subsequent inflation to close the gap between the equalized static pressure and the target pressure occurs by supplying one or more short pulses of compressed fluid from fluid supply 32 to tires 28, each pulse being followed by an equalization delay and static pressure measurement, as described below. The additional pressurized fluid required for realizing a static pressure equal to the target pressure may be discretized, or determined, for example, based on inflating and settling characteristics of system 10 stored in and interpolated from a look up table retained in a memory of control unit 42. Accordingly, if measured dynamic pressure is not greater than the target pressure, control unit 42 passes control along branch $B_{45}$ to step S60, described below. If measured dynamic pressure is greater than the target pressure, control unit 42 passes control along branch $B_{40}$ to step S55.

At step S55, the invention provides for determining whether a line leak fault exists. Step S55 is similar to step S10, described above, therefore described no further herein. If control unit 42 determines that a line leak flag has been set, control unit 42 passes control along branch B60 to step S70, described below. If control unit 42 determines that a line leak flag has not been set, control unit 42 passes control along branch B65 to step S75, described below.

At step S60, the invention provides for determining whether the dynamic inflating time exceeds a dynamic inflating time limit. The dynamic inflating time limit is manufacturer-configurable or manufacturer determined. This ensures that fluid source 32 is capable of supplying fluid at an adequate pressure to increase tire pressure. Accordingly, if the dynamic inflating time is not greater than the dynamic inflating time limit, control unit 42 passes control along branch B50 back to step S25, described above. If the dynamic inflating time is greater than the dynamic inflating time limit, therefore control unit 42 passes control along branch B55 to step S65 to determine whether sufficient fluid source pressure exists to continue dynamic inflation.

At step S65, the invention provides for measuring the gage pressure in the conduit assemblies and storing the value as a dynamic pressure variable. This establishes a reference pressure value which, following a fluid source pressure check, in step S80, is compared against a pressure value offset therefrom, as discussed below. Control unit 42 then passes control to step S80, described below.

At step S70, the invention provides for determining whether the gage pressure of the conduit assemblies is greater than the sum of a manufacturer-configured, or manufacturer designated, target pressure plus a manufacturer-configured, or manufacturer designated, dynamic inflation overshoot amount. The overshoot amount added to the target pressure amount is configured to counteract typical losses occasioned by line leaks. On other words, since, at step S55, existence of a line leak is presumed, the method compensates for fluid, hence fluid pressure, lost due to the line leak by executing an overinflation routine. The overinflation routine does not terminate until the conduit assemblies exhibit a pressure value that, absent a line leak, would be likely to realize a pressure in tires 28 in excess of the target, but, as a consequence of the line leak, may be likely to realize a pressure in tires 28 that equals or approaches the target. Accordingly, if gage pressure is greater than the target, overinflation may not be needed to compensate for line leaks, therefore control unit 42 passes control along branch B80 to step S45, as described above. However, if gage pressure is not greater than the target, overinflation may be required to compensate for line leaks, therefore control unit 42 passes control along branch B85 to step S100, described below.

At step S75, the invention provides for allowing the conduit assemblies and tires 28 to reach equilibrium. Control unit 42 instructs supply solenoid 82 to close, but allows control solenoids 86, 88 and/or 90 to remain open, thereby maintaining fluid communication among the conduit assemblies and tires 28 without having additional pressurized fluid introduced thereto. Control unit 42 then passes control to step S90, described below.

At step S80, the invention provides for determining the pressure of fluid available from fluid source 32. Such may be achieved, for example, by calling a subroutine (not shown) which returns a supply fluid pressure value. Control unit 42 then passes control to step S85.

At step S85, the invention provides for determining whether the dynamic pressure variable, as described with respect to step S65, is less than the difference of the supply fluid pressure value, described with respect to step S80; less a manufacturer-configured, or manufacturer designated, dynamic inflation offset amount. The offset ensures that fluid source 32 is greater than, thus able to increase, the pressure of tires 28, as opposed to merely statically pressurizing rotary seal assembly 50. Accordingly, if the dynamic pressure variable is less than the offset supply fluid pressure value, control unit 42 passes control along branch B70 to branch B25 and then to step S20, as described above. If the dynamic pressure variable is not less than the offset supply fluid pressure value, system 10 exhibits normal functioning characteristics, therefore control unit 42 passes control along branch B75 to branch B50 and then to step S25, described above.

At step S90, the invention provides for measuring the equilibrium gage pressure in the conduit assemblies and storing the value as a static pressure variable for use in subsequent step S95. Control unit 42 then passes control to step S95.

At step S95, the invention provides for determining whether the static pressure variable is greater than or equal to the target pressure. If the static pressure variable is greater than or equal to the target pressure, system 10 exhibits normal functioning characteristics, therefore control unit 42 passes control along branch B90 to step S110, described below. If the static pressure variable is not greater than or equal to the target pressure, incremental inflation is required to bring tires 28 up to target pressure, as described above with respect to step S50, therefore control unit 42 passes control along branch B95 to step S100.

At step S100, the invention provides for inflating for a discrete, manufacturer-configured, or manufacturer designated, inflation time. Control unit 42 opens solenoid 82 and any of solenoids 86, 88 and/or 90, and closes solenoid 84, thereby fostering fluid communication between fluid source 32 and tires 28. After the inflation time, control unit 42 passes control to step S105.

At step S105, the invention provides for determining tire pressure. Like step S80, described above, such may be achieved, for example, by calling a subroutine (not shown) which returns a tire pressure value. The invention then provides for cycling through the method once again to bring tire pressure up to the target pressure, therefore control unit 42 passes control to step S10, described above.

A step S110, the invention provides for extinguishing the lamp illuminated in step S20. Thus conditions identified steps preceding step S20 which suggested a problem with respect to system 10 or tires 28 are deemed to have been corrected, thus not regarded as symptomatic of failures in system 10 or tires 28. Control unit 42 then passes control to step S45, described above.

While the invention has been particularly shown and described with reference to the preferred embodiments thereof, it is well understood by those skilled in the art that various changes and modifications can be made in the invention without departing from the spirit and scope of the invention.

We claim:

1. Method of inflating a tire with a tire pressure management system comprising:

introducing continuous fluid flow of a fluid from a fluid source into the tire through a fluid control circuit;

ascertaining the dynamic pressure of the fluid during said introducing continuous fluid flow using a sensor disposed in a conduit of said fluid control circuit;

terminating continuous fluid flow when the dynamic pressure exceeds or equals a predetermined amount; and introducing fluid flow of the fluid from said fluid source into the tire for a predetermined time through said fluid control circuit.

2. Method of claim 1, wherein the predetermined amount substantially equals a target pressure.

3. Method of claim 1, further comprising:

ascertaining a static pressure of fluid in the tire prior to said introducing continuous fluid flow; and initiating an alarm when the static pressure is less than a second predetermined amount.

4. Method of claim 3, wherein the second predetermined amount substantially equals ninety percent of the predetermined amount.

5. Method of claim 1, further comprising initiating an alarm if a duration of said inflating exceeds a predetermined time.

6. Method of claim 1, further comprising ascertaining a source pressure of said fluid source if a duration of said introducing continuous fluid flow exceeds a predetermined time.

7. Method of claim 6, further comprising initiating an alarm if the dynamic pressure is less than the source pressure offset by an offset amount.

8. Method of claim 1, further comprising ascertaining a static pressure of fluid in the tire prior or subsequent to said introducing pulsed fluid flow.

9. Method of claim 8, further comprising terminating pulsed fluid flow when the static pressure exceeds a second predetermined amount.

10. Method of claim 9, wherein the second predetermined amount substantially equals a target pressure.

11. Method of claim 1, further comprising:

pausing after terminating continuous fluid flow until the fluid attains a static pressure as measured by said sensor; and determining whether the static pressure exceeds a second predetermined amount.

12. Method of claim 11, wherein one or both of the predetermined amount and the second predetermined amount substantially equal a target pressure.

13. Method of claim 11, wherein said step of introducing fluid flow of the fluid from said fluid source into the tire for a predetermined time occurs only if the static pressure does not exceed the second predetermined amount.

14. Method of claim 13, further comprising terminating pulsed fluid flow when the static pressure exceeds a third predetermined amount.

15. Method of claim 14, wherein the third predetermined amount substantially equals a target pressure.

16. Method of claim 11, further comprising ascertaining a source pressure of a said fluid source if a duration of said introducing continuous fluid flow exceeds a predetermined time.

17. Method of claim 16, further comprising initiating an alarm if the dynamic pressure is less than the source pressure offset by an offset amount.

* * * * *